US010373083B2

(12) United States Patent
Bittner et al.

(10) Patent No.: US 10,373,083 B2
(45) Date of Patent: Aug. 6, 2019

(54) SYSTEM FOR IMPROVING PRODUCTION PROCESSES

(75) Inventors: Maik Bittner, Heidelberg (DE); Jürgen Marschar, Bammental (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 148 days.

(21) Appl. No.: 13/099,481

(22) Filed: May 3, 2011

(65) Prior Publication Data

US 2011/0270651 A1 Nov. 3, 2011

(30) Foreign Application Priority Data

May 3, 2010 (DE) .......................... 10 2010 019 063

(51) Int. Cl.
*G06Q 10/06* (2012.01)

(52) U.S. Cl.
CPC .......... *G06Q 10/06* (2013.01); *G06Q 10/0639* (2013.01); *G06Q 10/06398* (2013.01)

(58) Field of Classification Search
CPC ................................................. G06Q 10/0639
See application file for complete search history.

(56) References Cited

U.S. PATENT DOCUMENTS

| 4,803,634 | A | 2/1989 | Ohno et al. |
| 4,901,587 | A | 2/1990 | Deremo et al. |
| 7,287,473 | B2 | 10/2007 | Kleibaumhueter et al. |
| 7,950,063 | B2 * | 5/2011 | Oelsner ........................... 726/28 |
| 2002/0077979 | A1 | 6/2002 | Nagata |
| 2002/0184164 | A1 * | 12/2002 | Quine ............................. 705/401 |
| 2004/0127999 | A1 | 7/2004 | Murase et al. |
| 2005/0171660 | A1 * | 8/2005 | Woolford et al. ................ 701/33 |
| 2005/0251685 | A1 * | 11/2005 | Oelsner .......................... 713/182 |
| 2006/0078859 | A1 * | 4/2006 | Mullin ............... G03G 15/5016 434/219 |
| 2006/0229851 | A1 * | 10/2006 | Cannon .................. G07C 5/008 702/193 |
| 2007/0192173 | A1 | 8/2007 | Moughler et al. |

(Continued)

FOREIGN PATENT DOCUMENTS

| DE | 3630876 A1 | 3/1987 | |
| GB | 2459459 A * | 10/2009 | ......... G05B 19/4083 |

(Continued)

OTHER PUBLICATIONS

A.P. Longstaff, et.al., "The Role of Measurement and Modelling of Machine Tools in Improving Product Quality," 2013, International Journal of Metrology and Quality Engineering, vol. 4, No. 3, pp. 177-184 (Year: 2013).*

(Continued)

*Primary Examiner* — Amanda Gurski
(74) *Attorney, Agent, or Firm* — Laurence A. Greenberg; Werner H. Stemer; Ralph E. Locher

(57) ABSTRACT

A performance evaluation system has a computer for displaying the production performance of a machine compared with the production performance of other machines. The machines a connected via a network link to a performance comparison computer. The invention is set up such that comparison data from the performance comparison computer are displayed at least to the operator of a machine via the display of the computer for displaying the production performance.

13 Claims, 1 Drawing Sheet

(56) References Cited

U.S. PATENT DOCUMENTS

2007/0266424 A1 11/2007 Haaf et al.
2008/0010005 A1* 1/2008 Small et al. .................. 701/120

FOREIGN PATENT DOCUMENTS

WO 0213105 A2 2/2002
WO WO-2012092599 A1 * 7/2012 ............. G07C 5/008

OTHER PUBLICATIONS

Jingshan Li, et. al., "Throughput Analysis of Production Systems: Recent Advances and Future Topics," Jul. 2009, International Journal of Production Research, vol. 47, No. 14, pp. 3823-3851. (Year: 2009).*
German Patent and Trademark Office Search Report, dated Feb. 24, 2011.

* cited by examiner

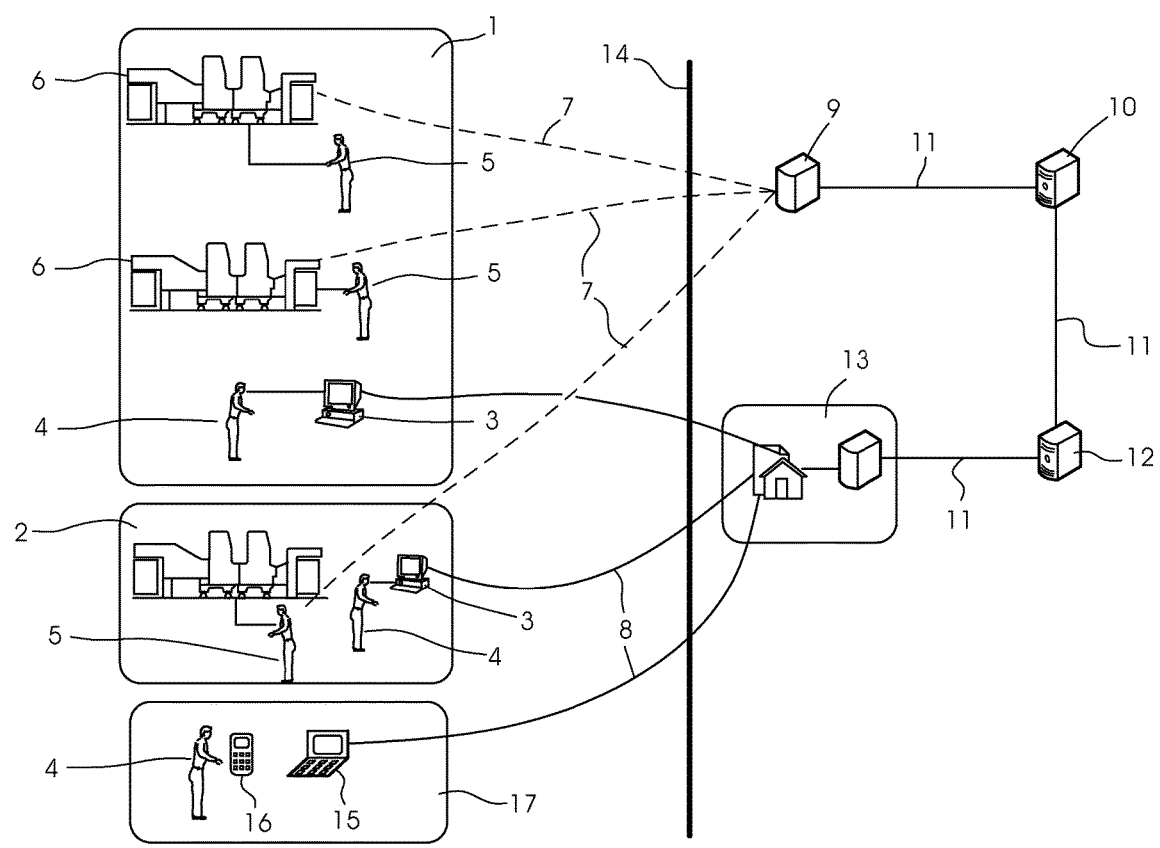

SYSTEM FOR IMPROVING PRODUCTION PROCESSES

CROSS-REFERENCE TO RELATED APPLICATION

This application claims the priority, under 35 U.S.C. § 119, of German patent application DE 10 2010 019 063.2, filed May 3, 2010; the prior application is herewith incorporated by reference in its entirety.

BACKGROUND OF THE INVENTION

Field of the Invention

The present invention relates to a system having a computer for displaying the production performance of a machine in comparison with the production performance of other machines, the machines being connected via a network link to a computer for carrying out a performance comparison.

Competition between and among print shops with low margins has recently become very hard, so that each print shop must strive continually to operate its machinery particularly efficiently and utilize it effectively. Here, for the operator of printing presses, it is of particular interest to learn how he stands in comparison with the competition. Hitherto, it has not been possible to attain a reliable estimation of the performance of the in-house printing press in comparison with comparable printing presses of a competitor. This knowledge is also of interest to other machine operators who operate costly machinery.

United States patent application publication No. US 2007/0192173 A1 discloses an operator training system for the operators of construction machines which compares the performance of different operators of construction machines in a company with one another. To this end, there are sensors in the construction machines which measure the performance, such as the distance traveled and the loads moved in the process, and transmit these via a wire-free connection to a computer for carrying out a performance comparison. In this way, the management of a construction firm can establish how the performance of their construction machine operators appears in comparison. These performances of the construction machine operators can then also be used to configure the salary of the construction machine operators as a function of performance and calculate appropriate additional payments or reductions. At the same time the system offers training methods to construction machine operators who lie below the average, in order to improve their performance. However, that system has the disadvantage that the construction machine operator himself has nothing from the performance comparison with the other construction machine operators, since he knows only that he lies below the average when his salary is reduced and he is offered training possibilities but he is not given any qualitative estimation.

SUMMARY OF THE INVENTION

It is accordingly an object of the invention to provide a system for evaluating and improving production processes which overcomes the above-mentioned disadvantages of the heretofore-known devices and methods of this general type and which provides for performance comparison for operators of machines in which the operator of a machine is provided information about the performance of comparable machines belonging to the competition.

With the foregoing and other objects in view there is provided, in accordance with the invention, a production performance evaluation system, comprising:

a performance comparison computer connected via a data link to a plurality of machines and configured to carry out a performance comparison between a production performance of one machine and a production performance of at least one other machine;

a production performance display computer connected to said performance comparison computer and configured to display the production performance of the one machine in comparison with the production performance of the at least one other machine;

wherein the system is configured for displaying production performance comparison data from said performance comparison computer, at least to an operator of a respective machine, via a display of said production performance display computer.

In other words, the objects of the invention are achieved with a system that substantially comprises a computer for carrying out a performance comparison, which is set up at the manufacturer of the machine or at a service partner. This performance comparison computer is connected in a wire-bound or wire-free manner via data links to the control computers of those machines of which the performance is being compared with one another. For example, all the machines from a manufacturer which are in companies for which the operator works can be connected to the performance comparison computer, for example via an Internet link, so that the performance comparison data from these machines in the different companies can be transmitted to the performance comparison computer. In addition, each operator of the machines has the possibility, via a computer which is likewise connected to the performance comparison computer in a wire-bound or wire-free manner, preferably via the Internet, to have the production performance of the comparable machines displayed on a display device of his computer. In this case, the operator of the machine can immediately obtain an overview of the performance of comparable machines in competitors' companies and thus knows how he has to judge his production performance as compared with the competitors. The system according to the invention is suitable in particular to assess the performance of print shops with comparable machines and to indicate to the operators of the printing presses an assessment of their performance in comparison with competing companies.

In accordance with a first refinement of the invention, provision is made for the computer for the performance comparison to be connected to an Internet portal access, which identifies the operator before the access to the comparison data, and only in the case of a successful identification is a display of the comparison data carried out on the computer for displaying the production performance. This Internet portal access can be integrated into the performance comparison computer but there can also be a further computer as an Internet server, on which the Internet portal access is installed and which is connected to the performance comparison computer via a network link. The Internet portal access substantially comprises an Internet website on which the operator of the machines can log in with a user identifier and an appropriate password. In this way, it is ensured that only operators of machines who are authorized for the purpose are given access to the comparison data from other machines. Thus, it is possible to ensure that only operators of the machines who are themselves ready also to send their data about production performance to the performance comparison computer and to participate in the system for performance assessment are given comparison data about their production performance. This is important, since effective assessment of the production performance of comparable machines is carried out only when there is an appropriate number participants. Only in this way is a meaningful performance assessment possible.

In a further refinement of the invention, provision is made for performance data and/or operating data from the machines to be transmitted to the comparison computer via an Internet link for remote service. It is already known, for the purpose of remote service, to acquire the operating data and performance data of a printing press in the machine control system and, when service is needed, to transmit said data to a service computer at the printing press manufacturer or a service partner. This data is also extremely well suited to assessing the performance of a printing press, so that no additional data acquisition is necessary. For this reason, the performance and operating data from the machines that is acquired for service purposes is also transmitted to the comparison computer, so that the latter can access this data and carry out a performance assessment. This transmission can be implemented quite simply by the data transmitted via the Internet to a computer for remote service also being passed on via a network link to the comparison computer for performance assessment, so that said data is available to the latter. In this way, it is also possible to enlarge the scope of data for the comparison computer when the data acquisition for the remote service is enlarged. The great advantage resides in the fact that no additional acquisition of data is needed; instead it is possible to make use of the transmission of the data for remote service purposes.

In accordance with again an added feature of the invention, it is possible for data for classifying the machines from which the data are sent to be stored in the performance comparison computer and for the performance comparison computer to assign the data from the sending machines to comparison classes. In order to be able to compare the performance of machines practically with one another it is important both to classify the performance data from the machines to be compared and also the data about the jobs processed on the machines, such as print jobs. Thus, for instance, the data from the printing presses involved can be evaluated as to the configuration in which the printing presses are constructed, i.e. in which format they operate, how many printing units, varnishing units they have and with what automation technology they are equipped. In a corresponding way, the print jobs processed on these machines are also classified, so that a meaningful performance comparison as a function of the performance classes of the printing presses and of the performance classes of the print jobs processed is possible. The system is also set up in such a way that new comparison classes are created automatically by the incoming data being evaluated continuously with regard to differences in the configuration of the machines and the scope of the print jobs. For this purpose, known neural networks and Bayes methods can be used. Further comparison classes are different markets in different countries or different personnel teams on the machines and in the press room.

In accordance with a particularly advantageous refinement of the invention, provision is made for suggestions for increasing the productivity of the machine to be transmitted from the performance comparison computer to the operator of the machine on the computer for displaying the production performance. When the operator of a machine sees that his production performance is lower as compared with other companies, then the performance comparison computer can make suggestions to him for increasing his productivity. These suggestions are in turn based on the performance comparison data from the other machines. These suggestions can include more efficient operating methods of the existing machines operated by the operator but suggestions can also point in the direction wherein the operator should procure newer, more efficient machines.

In accordance with yet an additional feature of the invention, there is provided a standardized data interface for transmitting the performance data for different machines. In this case, a standardized format is provided for the data interface, so that data from different machines, even from different manufacturers, can be compared practically with one another in the performance comparison computer. To this end, standardized criteria are defined as to which data from the machine control system of the individual machines can expediently be acquired in all the machines, and also a standardized data format, so that comparability is provided. Data which can be acquired only in a few machine types is thus sorted out or, if appropriate, weighted less heavily during the performance comparison.

In accordance with yet another feature of the invention, the operator of the machine may select a comparison class for the performance comparison as a function of his own machine and his jobs to be completed thereon and the operator may send the class to the performance comparison computer. In this way, the operator of the machine has the possibility himself of selecting suitable comparison classes for comparable machines and print jobs. This is expedient when the operator of a machine for example intends to invest in a new machine. In this case, the operator is able to compare the production performance of other machine types with the same range of jobs and thus establish whether an investment would be worthwhile.

Advantageously, provision is further made for the operator to select the suggestion relating to increasing performance via an operating element on the computer for displaying the production performance. The suggestions relating to performance improvement disseminated by the printing press manufacturer or his service partner are transmitted from the performance comparison computer to the operator of the machine and displayed on his computer for displaying the production performance. Via keyboard, mouse or touch screen, the operator can then select the suggestions acceptable to him as a function of the costs to be expected for the implementation of the suggestions and even at the same time, automatically or via an Internet link to the manufacturer, order products and services needed for the increase in performance. After the selection of the suggestions acceptable to the operator, and after the data has been sent back to the performance comparison computer, an order confirmation for the products and services requested can in turn be sent in the opposite direction to the operator. In this way, it is possible to automate the ordering processes in order to increase production performance.

In accordance with again an additional feature of the inveniton, provision is made for it to be possible to display the data relating to the performance comparison in different representations as a function of the internal company position of the operator within the company. In a print shop, different people work in different positions. For instance, the press operator who operates the machine is interested in different performance data than the manager of a print shop, who is more interested in commercial data. Thus, each co-worker in the print shop can be given his own access to the web portal and enter his function there, so that he is given the prepared data from the performance comparison that is of interest to him. This avoids the manager of a print shop being overwhelmed with technical performance data in which he is not interested, while the press operator is overwhelmed with commercial data which in turn is of no interest to him or her.

In accordance with a concomitant feature of the invention, provision is made for the suggestions for improving the productivity also to draw up an environmental evaluation in which, for example, the $CO_2$ output at the necessary machine performance, the paper consumption and the $CO_2$ output when the machine is idling are calculated and displayed. In addition, with regard to environmental friendliness, optimization suggestions relating reducing the carbon footprint and to avoiding unnecessary $CO_2$ output as a result of unnecessary power consumption are made and displayed.

Other features which are considered as characteristic for the invention are set forth in the appended claims.

Although the invention is illustrated and described herein as embodied in a system for improving production processes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing shows a system according to the invention with two print shops that are connected to a performance comparison computer.

DETAILED DESCRIPTION OF THE INVENTION

Referring now to the FIGURE of the drawing in detail, there is shown an exemplary system according to the invention for evaluating and comparing the performance of the productivity of several printing presses 6. Here, the performance data from printing presses 6 belonging to two print shops having a first press room 1 and a second press room 2 are compared with each other. The printing presses 6 have a machine computer which acquires the operating data, performance data and further data in printing presses 6 and transmits the data via an Internet link 14 and a firewall 9 to a remote service computer 10. This transmission via the Internet is carried out via the remote service links 7 also provided for remote service purposes. From the remote service computer 10, the operating data acquired is transmitted via a LAN network 11 to the performance comparison computer 12. The firewall 9, the remote service computer 10 and the performance comparison computer 12, and also the server for the web portal 13, are located at the printing press manufacturer. In addition, in each of the two press rooms 1, 2 there is a press room PC 3, which is likewise connected via the Internet 14 to the printing press manufacturer. However, this link 8 runs via the web portal 13. This web portal substantially comprises a server which displays an Internet website via which the personnel in the press rooms 1, 2 can log in. When traveling, it is also possible to log in to the web portal 13 via a smart phone 16 or a laptop 15 when in a hotel 17, so that the press room manager 4 has access to comparison data at any time. A print shop can also have several press rooms 1, 2 in different countries, which the press room manager 4 is able to monitor for performance via the press room computer 3 or the smart phone 16 or the laptop 15.

The press room computers 3, 15, 16 are referred to herein as production performance display computers or display computers.

Working in the press rooms 1, 2 are firstly the printers or press operators 5, who operate the printing presses 6, and also press room managers 4, who in particular carry out the management of the print shop and also carry out the costing of the print jobs. Press operator 5 and press room manager 4 each have their own user login and their own password, via which they are able to log in to the press room PC 3. Following successful login via the computer to the web portal 13, press room manager 4 and press operator 5 then have access to the performance comparison data which is provided by the performance comparison computer 12. Hence, press room manager 4 and press operator 5 in the first press room 1 can have the productivity of their printing presses 6 displayed in comparison with the printing press 6 in the print shop of the second press room 2 and vice versa. Therefore, both print shops know where they stand in relation to productivity in comparison with the competition. Furthermore, the comparison computer 12 is able to calculate suggestions for improving the productivity on the basis of more productive print shops and to transmit said suggestions into the press room PC 3 via the link 8 of the web portal 13. On the press room PC 3, the press operator 5 or the press room manager 4 can then accept the suggestions and order appropriate products and services for increasing the productivity, by the desired suggestions being confirmed. The order is then in turn transmitted to the comparison computer 12 via the link 8 to the web portal 13, so that the printing press manufacturer can then implement the desired suggestions.

The display of the performance data on the press room PC 3 is carried out as a function of the person logging in, i.e. a press room manager 4 can have different performance data displayed than a press operator 5. In this way, the persons involved in each case see only the data that are relevant to them. During the display of the data, in addition mean values, best values, median or deciles (uppermost 10%) from comparable machines 6 are displayed in a suitable comparison class. The suggestions relating to improvement can be displayed to the press operator 5 and the press room manager 4 in the form of an Internet link on the press room PC 3, on which the user 4, 5 can then click and thus have the suggestions displayed. In choosing the comparison classes, identical machine types, identical regions, identical levels of difficulty of the print job can be selected, so that the personnel 4, 5 can themselves select with whom they would like to be compared. Via the identified login via the web portal 13, it is ensured that only authorized persons 4, 5 have access to the data. In addition, the data is analyzed anonymously, so that the personnel 4, 5 cannot use it to draw any conclusions about the origin of the comparison data and therefore about the print shops involved. The system according to the invention has the great advantage that it is largely based on the data which is in any case ascertained for remote service purposes, which is evaluated in an additional performance comparison computer 12 and serves as a basis for the performance comparison.

The invention claimed is:

1. A production performance evaluation and production process improvement system, comprising:

a local production machine at an operator's location running a production process, said local production machine having local machine computer;

a plurality of production machines provided at competitors' locations each having a respective machine computer;

a performance comparison computer connected via an Internet link for remote service to each said respective machine computer and to said local production machine computer, said performance comparison computer being set up at a manufacturer of said production machines or at a service partner of the manufacturer, said respective machine computers each gathering production performance in a corresponding production machine of said plurality of production machines, said performance comparison computer acquiring production performance from said respective machine computers of said plurality of machines and from said local machine computer, said performance comparison computer being programmed for automatically carrying out a production performance comparison between a production performance of said local production machine and a production performance of at least one of said plurality of production machines, said performance comparison computer programmed for calculating suggestions or offers for increasing the productivity of said local production machine, for an operator of the one local production machine, on the basis of the production performance comparison between the production performance of said local production machine and the production performance of said at least one of said plurality of said production machines;

a production performance display computer located at said local production machine and connected via the Internet link to said performance comparison computer, said production performance display computer displaying the production performance comparison;

the system sending the production performance comparison data and the suggestions or offers for increasing the productivity of the production machine via the Internet link from said performance comparison computer to said production performance display computer for displaying the production performance comparison data and the suggestions or offers for increasing the productivity of the production machine via a display of said production performance display computer to the operator of said local production machine;

said production performance computer being configured for generating an operator selectable operating element on said production performance display computer for implementing the suggestions or offers and improving the production process on said local production machine;

upon selection of said operator selectable operating element, said production performance computer implementing the suggestions or offers and modifying the production process on the local production machine in accordance therewith.

2. The system according to claim 1, wherein said performance comparison computer is connected to an Internet access portal configured to identify a user prior to enabling access to the comparison data, and wherein said production performance display computer displays the production performance comparison only in a case of a successful identification.

3. The system according to claim 1, wherein, following the transmission via the Internet link, the data are first stored on a remote service computer and passed on from the remote service computer via a network to said comparison computer.

4. The system according to claim 1, wherein data for classifying the production machines sending the data are stored in said performance comparison computer, and said performance comparison computer is configured to assign the data from the sending machines to comparison classes.

5. The system according to claim 1, which comprises a standardized data interface for transmitting performance data for different production machines.

6. The system according to claim 1, wherein said production comparison computer provides comparison classes to the operator of the production machine for selection of a comparison class for the performance comparison as a function of his respective production machine and his jobs to be completed thereon, and the selected class being transmitted to said performance comparison computer.

7. The system according to claim 1, wherein said production performance display computer is configured to display the data relating to the production performance comparison in mutually different representations in dependence on a position of the operator internally within the company.

8. A method for evaluating performance between production machines and improving production performance on a local production machine by a performance evaluation and production process improvement system, the method comprising:

providing a performance comparison computer connected via an Internet link for remote service to a plurality of production machines each having a respective machine computer for obtaining production performance therefrom, at least some of the production machines being provided at competitors' locations, the performance comparison computer being set up at a manufacturer of said production machines or at a service partner of the manufacturer;

acquiring production performance in the plurality of machines with each respective machine computer with the performance comparison computer;

automatically carrying out a production performance comparison, on the performance comparison computer, between a production performance of one local production machine and a production performance of at least one other external production machine at a competitor with the production performance obtained from the respective machine computers;

calculating, on the performance comparison computer, suggestions or offers for increasing the productivity of the one local production machine, for an operator of the production machine, on the basis of the production performance comparison between the production performance of the one local production machine and the production performance of the at least one other external production machine at the competitor;

providing a production performance display computer located at the one local production machine connected via the Internet link to the performance comparison computer for displaying the production performance comparison;

the system sending the production performance comparison and the suggestions or offers for increasing the productivity of the production machine from the performance comparison computer to the production performance display computer via Internet; and displaying the production performance comparison and the suggestions or offers for increasing the productivity of the production machine via a display of the production performance display computer at least to an operator of the one local production machine;

the production performance computer generating an operator selectable operating element on said production performance display computer for implementing the suggestions or offers;

implementing the suggestions or offers and improving the production process on the one local production machine upon selection of the operating element by the operator.

9. The method according to claim 8, further comprising:

connecting the performance comparison computer to an Internet access portal configured to identify a user prior to enabling access to the comparison data;

identifying a user and displaying the production performance comparison only in a case of a successful user identification.

10. The method according to claim 9, further comprising:

ensuring that only identified users of the production machines that are ready to send data about production performance to the performance comparison computer and to participate in the system for performance assessment are given comparison data about their production performance.

11. The method according to claim 8, further comprising:

providing the production machines as printing machines;

sending print job data of individual print jobs processed on the production machines to the performance comparison computer.

12. The method according to claim 11, further comprising:

classifying the print jobs processed on the production machines for providing a meaningful performance comparison as a function of performance classes of the printing machines and of performance classes of the print jobs processed.

13. The system according to claim 1, wherein said performance comparison computer is configured for determining more productive production machines of the plurality of production machines and using the more productive production machines for calculating suggestions or offers for increasing the productivity of the one local production machine to an operator of the one local production machine.

* * * * *